(12) United States Patent
Shembavnekar et al.

(10) Patent No.: US 9,690,666 B1
(45) Date of Patent: Jun. 27, 2017

(54) INCREMENTAL BACKUP OPERATIONS IN A TRANSACTIONAL FILE SYSTEM

(75) Inventors: Sujit Shrinivas Shembavnekar, Maharashtra (IN); Mohammed Eliyas N. A. Shaikh, Maharashtra (IN); Syed Mehtab Ali, Maharashtra (IN); Amitrajit Banerjee, Maharashtra (IN); Ravindra V. Teli, Pune (IN)

(73) Assignee: Veritas Technologies LLC, Mountain View, CA (US)

( * ) Notice: Subject to any disclaimer, the term of this patent is extended or adjusted under 35 U.S.C. 154(b) by 832 days.

(21) Appl. No.: 13/539,913

(22) Filed: Jul. 2, 2012

(51) Int. Cl.
*G06F 3/06* (2006.01)
*G06F 11/14* (2006.01)

(52) U.S. Cl.
CPC ...... *G06F 11/1451* (2013.01); *G06F 11/1458* (2013.01); *G06F 11/1461* (2013.01); *G06F 11/1466* (2013.01); *G06F 3/0604* (2013.01); *G06F 3/0647* (2013.01); *G06F 3/0683* (2013.01)

(58) Field of Classification Search
CPC ............. G06F 11/1448; G06F 11/1451; G06F 11/1458; G06F 11/1461; G06F 11/1466; G06F 3/0647; G06F 3/0604; G06F 3/0683
See application file for complete search history.

(56) References Cited

U.S. PATENT DOCUMENTS

| | | | |
|---|---|---|---|
| 5,548,750 A * | 8/1996 | Larsson et al. | |
| 5,907,672 A * | 5/1999 | Matze et al. | 714/6.13 |
| 6,484,234 B1 * | 11/2002 | Kedem | 711/113 |
| 6,526,418 B1 * | 2/2003 | Midgley et al. | 707/640 |
| 2006/0294047 A1 * | 12/2006 | Johnston | G05B 19/0426 |
| 2011/0040906 A1 * | 2/2011 | Chung et al. | 710/57 |

* cited by examiner

*Primary Examiner* — Arpan P. Savla
*Assistant Examiner* — William E Baughman
(74) *Attorney, Agent, or Firm* — Campbell Stephenson LLP

(57) ABSTRACT

Various systems and methods for performing incremental backups in transactional file systems. For example, one method involves performing the first stage of a multi-stage write operation, where the write operation writes a data block. The method then involves performing a backup operation. However, the backup operation does not backup the modified block, since not all stages of the multi-stage write operation have been performed. The method involves updating metadata to indicate that though the data block was modified and a backup operation was performed, the data block was not included in the backup operation. After all stages of the multi-stage write operation have completed, e.g., a transaction is committed, a subsequent backup operation is performed. The data block is backed up during the subsequent backup operation.

20 Claims, 9 Drawing Sheets

INCREMENTAL BACKUP OPERATIONS IN A TRANSACTIONAL FILE SYSTEM

FIELD OF THE INVENTION

This invention relates to data storage and, more particularly, to performing incremental backup operations in a transactional file system.

DESCRIPTION OF THE RELATED ART

Various data protection techniques are used to improve the availability of data. For example, backup techniques are used to provide redundant copies of data. If the original copy of the data is lost, e.g., due to equipment failure or human error, the data can be restored from a backup copy of the data made at an earlier point in time. Backup techniques include full backups and incremental backups. Full backups create a copy of an entire set of data stored in a particular storage entity. Incremental backups create a copy of only those portions of the set of data that are modified during a particular time period, such as those portions of the set of data that are modified after a previous backup operation occurs.

A backup system that performs incremental backup operations keeps track of data changes that have occurred since a previous backup operation occurred. The backup system backs up the changed data when a subsequent incremental backup operation is performed. In certain computing environments, data changes occur in multiple stages. For example, a transactional file system involves data changes that occur in multiple stages. A transaction involves one or more data modification operations. For each data modification operation, data is actually modified, e.g., written, at a first time. However, the data modification operation is not complete until the transaction is committed. Separating the actual data write from completion of the data modification operation can make it difficult to track data changes and can render conventional backup systems ineffective for performing incremental backup operations.

BRIEF DESCRIPTION OF THE DRAWINGS

The present invention may be better understood, and its numerous objects, features and advantages made apparent to those skilled in the art by referencing the accompanying drawings.

Figure 1:
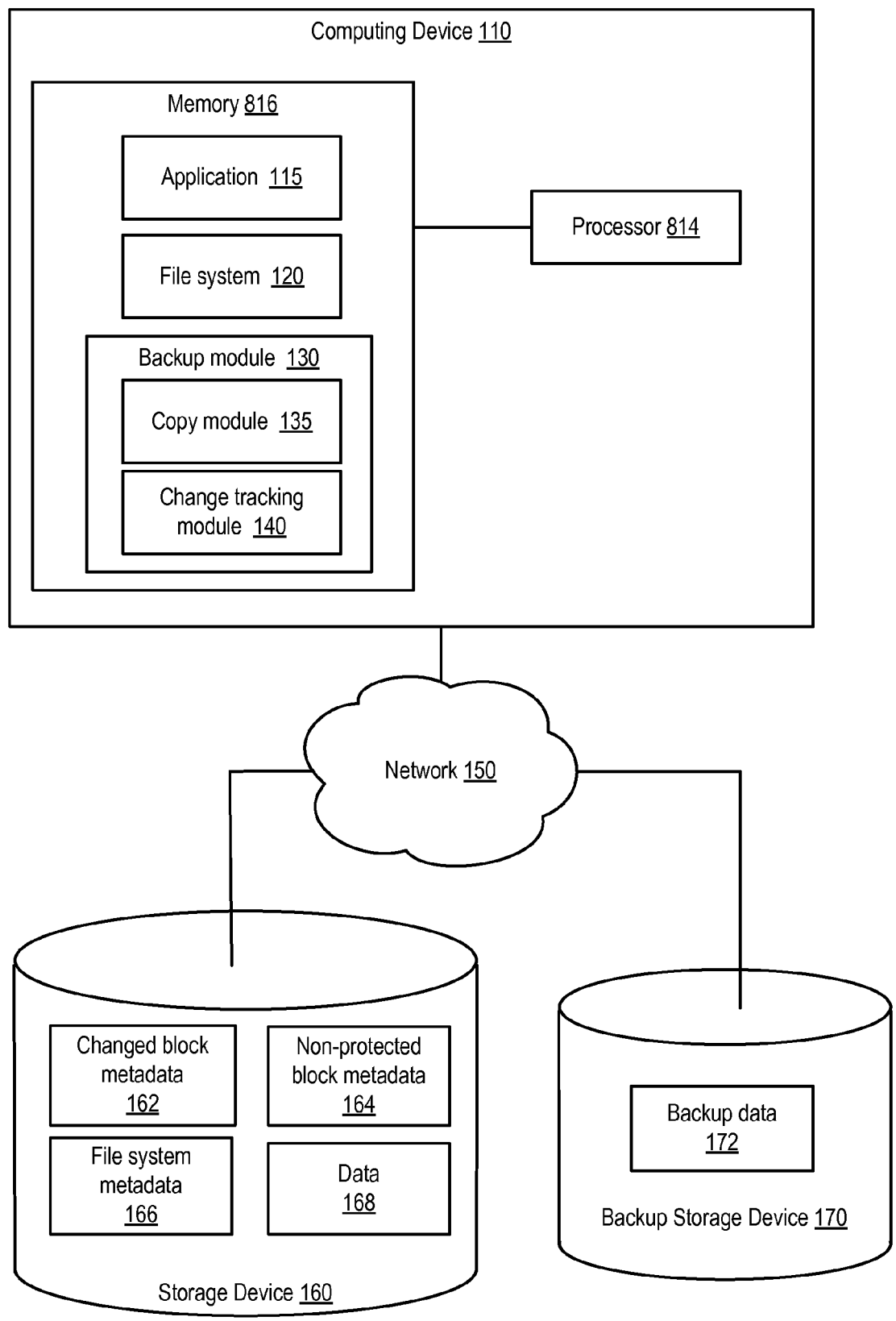
FIG. 1 is a block diagram of a system configured to perform backup operations, according to one embodiment of the present invention.

While the invention is susceptible to various modifications and alternative forms, specific embodiments of the invention are provided as examples in the drawings and detailed description. It should be understood that the drawings and detailed description are not intended to limit the invention to the particular form disclosed. Instead, the intention is to cover all modifications, equivalents and alternatives falling within the spirit and scope of the invention as defined by the appended claims.

DETAILED DESCRIPTION

One type of backup operation performed by conventional backup systems is an incremental backup operation. For an incremental backup operation, the backup system detects what data has been changed since a previous point in time, e.g., since a previous backup operation. Based on detecting that the data has been changed, the backup system selects the changed data to be included in an incremental backup that backs up only the changed data. For example, the backup system detects when an operation modifies data, and stores information indicating which data is modified. Operations that modify data can include write operations, delete operations, move operations, and the like. A block is considered changed if the block is allocated or assigned to a particular file or directory after having been unallocated before the change. The backup system stores the information indicating which data has been changed until the backup system performs a backup operation. When the backup system performs a backup operation, the backup system selects which data to backup, e.g., the changed data, using the information indicating which data is changed. The backup system can also backup metadata associated with the changed data, e.g., ownership information, access time, size, permissions, and the like, along with the changed data in the backup operation. Once the backup system executes the backup operation, the backup system clears the information that identifies the data as having been modified since the previous backup operation.

Data can be organized into any one or more of physical and/or logical groupings. For example, a file system can organize data into logical blocks. A block represents a quantity of data, such as 1024 bytes. File systems can create blocks of fixed or variable sizes. The present disclosure refers to blocks throughout, but it is understood that this terminology is used for the sake of clarity, and the present disclosure is not limited to blocks. To the contrary, the operations described herein can utilize any logical or physical grouping of data.

One way to detect whether a block has been changed involves accessing file system metadata. A file system typically maintains file system metadata indicating which blocks are allocated, or in use. The file system metadata can also include information identifying which blocks have been modified, as well as indicating when the allocation and/or modification occurred. The backup system can determine which blocks are allocated, as identified by the file system metadata. The backup system can detect changes to the file system metadata. Changes to the file system metadata indicate that blocks that correspond to the changed file system metadata are changed. In response to detecting changed blocks (as indicated by changes to the file system metadata) the backup system stores information identifying the changed blocks. For example, the backup system can add information identifying the blocks to a list of blocks to be included in subsequent backup operations. If file system metadata does not indicate that a block has been changed, the backup system does not recognize the block as having been changed and the backup system excludes such blocks that are not indicated as changed from subsequent incremental backup operations.

In the above description, the backup system depends on the file system metadata being updated to know which blocks should be included in a backup operation. In some environments, blocks are modified, but updates to file system metadata indicating the modifications are delayed. If the backup system performs an incremental backup operation after a block is modified, but before the file system metadata is updated to indicate the modification, the backup system will likely fail to include the modified block in the backup operation. For example, in a transactional file system, multiple blocks can be modified as a result of operations associated with an open transaction. While the transaction is open, the transactional file system does not update metadata to indicate that the modifications have occurred. Once the transaction is closed, or committed, the file system updates the file system metadata to identify those blocks that were modified as part of the transaction as changed blocks. If a backup system performs an incremental backup after several blocks are modified during the transaction, but before the transaction is committed, the backup system will not backup the modified blocks since the file system metadata does not indicate that the blocks have been modified. But when the backup system performs the incremental backup operation, the backup system clears information indicating that the blocks were updated since the previous backup operation. This results in the modified blocks not being backed up in subsequent incremental backup operations.

FIG. 1 is a block diagram of a system that can perform backup operations. The system of FIG. 1 can be configured to perform incremental backup operations in a file system that employs multi-stage data modification operations, such as a transactional file system. As shown, the system includes a computing device 110 coupled to a storage device 160 and backup storage device 170 via network 150. Network 150 can include a WAN (Wide Area Network), such as the Internet, one or more LANs (Local Area Networks), and/or one or more SANs (Storage Area Networks).

Computing device 110 is a computing device such as a personal computer, laptop computer, server, personal digital assistant, cell phone, or the like. Computing device 110 includes at least one processor 814 and a memory 816. Memory 816 stores program instructions executable by processor 814 to implement an application 115, a file system 120, and a backup module 130. Application 115 can include, for example, a word processing program, email program, graphic editing program, database application, server program, accounting software, spreadsheet tool, media consumption program, product development software, automatic update software, and the like. Application 115 accesses data 168 in storage device 160. For example, application 115 can write to and/or read from data 168.

Storage device 160 can be included within and/or coupled to (e.g., via a bus, network, or other appropriate interconnect) computing device 110. Storage device 160 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape).

File system 120 organizes data, such as data 168, into files and directories. File system 120 also maintains a listing, e.g., in file system metadata 166, of the locations of files in storage device 160. For example, when application 115 creates a new file, file system 120 determines which blocks of storage device 160 store data for the file. File system 120 updates file system metadata 166 to indicate which blocks of storage device have been allocated for a particular file. Similarly, when application 115 writes to data 168, file system 120 can allocate additional blocks to store the data that is written and update file system metadata 166 to indicate that additional blocks have been added or that blocks that are already in use have been updated. File system 120 keeps track of which blocks are used, which files store data in the used blocks, and which blocks are unused.

File system metadata 166 includes information identifying the blocks in storage device 160 that are used. In an embodiment, file system metadata 166 includes a bitmap that includes an entry, e.g., a bit, for each block of storage device 160. When file system 120 allocates a block, file system 120 sets a bit that corresponds to the block in the bitmap. When file system 120 de-allocates the block, or when the block is no longer in use, e.g., as is the case if application 115 deletes the file of which the block was a part, file system 120 clears the bit in file system metadata 166 that corresponds to the block to indicate that the block is no longer in use. File system metadata 166 need not include a bitmap and can also be implemented to include other types of information, e.g., a list of extents, where an extent includes a beginning address or offset and a length, indicating the size of the extent. File system 120 can update the list of extents to include those extents that are allocated.

File system 120 can be implemented as a transactional file system. Transactional file systems allow multiple operations to be performed as a single, or atomic, operation. This allows the multiple operations to fail or succeed as a whole, and allows the multiple operations to be rolled back in the case of a failure or other condition that indicates that the multiple operations should not complete. In a non-transactional file system, an application performs a modification operation that causes a block to be modified. In response to the modification operation, the non-transactional file system updates file system metadata to indicate the block was modified. With a transactional file system, the file system opens a transaction. Subsequent to the transaction being opened, an application can perform several modification operations that cause several blocks to be modified. The transactional file system associates each operation with the open transaction and notes that the blocks have been modified as a result of operations associated with the open transactions. However, the transactional file system does not update file system metadata to indicate that the blocks have been updated until the transaction is committed. To other applications, e.g., backup operations, it appears that the operations have not modified the blocks. If an error were to occur, this would avoid a subset of operations being performed. For instance, if an application needed to update ten blocks, but only five were updated when an error occurred, the transaction can be rolled back so that the data is not in a partially updated state, e.g., only five of the ten needed blocks written. In response to detecting a commit instruction, the file system closes the transaction, causing the operations associated with the transaction to be committed. In response to the transaction being committed, file system updates the file system metadata to indicate that that the several blocks have been modified. File system 120 can also update file system metadata 166 to indicate which transactions, if any, are open at any given time, and which blocks have been modified as a result of operations associated with each transaction. File system metadata 166 can also include information identifying which blocks have been modified as a result of operations associated with an open transaction. This can include a separate list or bitmap for each open transaction or one list or bitmap for all blocks affected by any open transaction. In one embodiment, file system metadata 166 identifies files which have been modified by operations associated with open transactions.

Backup module 130 performs backup operations including full backups and incremental backups. Copy module 135 and change tracking module 140 are included in backup module 130. Backup module 130 performs backup operations that backup data, such as data 168, from storage device 160 to backup data, such as backup data 172, in backup storage device 170.

Backup storage device 170 can be included within and/or coupled to (e.g., via a bus, network, or other appropriate interconnect) computing device 110. Backup storage device 170 provides persistent data storage, such that data stored on such a storage device will remain stored even after the storage device is powered off. Such a storage device can be, for example, a hard disk, a compact disc (CD), a digital versatile disc (DVD), or other mass storage device, or a storage system (e.g., a redundant array of independent disks (RAID) system or an optical storage jukebox) that includes an array of such storage devices. Such a storage device can also be a virtual or logical storage device that is implemented on such physical storage devices and/or storage systems. For example, such a storage device can be a logical volume that is implemented on a RAID storage system. Additionally, such a storage device can include one or more storage devices. A storage device can also include one or more types of storage media, including solid state media (e.g., flash drives), optical media (e.g., CDs and DVDs), and magnetic media (e.g., hard disks or magnetic tape).

Change tracking module 140 detects operations that modify data and updates changed block metadata 162 to reflect the changed data. In one embodiment, changed block metadata 162 includes a bitmap with an entry, e.g., a bit, for each block of data 168. For each block that change tracking module 140 detects as having been changed, change tracking module 140 sets a bit in the bitmap that corresponds to the block. When backup module 130 performs a backup operation, backup module 130 clears changed block metadata 162. Thus, changed block metadata 162 tracks blocks that have been changed since a prior backup.

In an incremental backup operation, backup module 130 backs up only blocks that have been changed since a previous backup operation. One indication of whether a block has been changed since a previous backup operation is whether a bit corresponding to the block is set in changed block metadata 162. Backup module 130 detects which blocks have been changed, as indicated by changed block metadata 162. Backup module 130 then detects whether file system 120 indicates that the changed blocks are in use. For example, if a block was changed, but subsequently deleted, changed block metadata 162 indicates the block is changed, but file system metadata 166 indicates that the block is no longer in use. Thus, there is no need to backup the block, and backup module 130 excludes the block from the backup operation. In another example, an application creates a block as part of a transaction, but the transaction has not been committed when backup module 130 executes an incremental backup operation. In this case, changed block metadata 162 indicates the block is changed, but file system metadata 166 indicates that the block is not in use. Consequently, backup module 130 excludes the block from the backup operation. In one embodiment, file system metadata 166 includes information identifying one or more files as having been changed, as does changed block metadata 162. Backup module 130 can select a file to backup in response to detecting that both changed block metadata 162 indicates that the file is changed and file system metadata 166 indicates that the file is in use.

For each bit of changed block metadata 162 that is cleared, change tracking module 140 detects whether the block was included in the backup operation, or was excluded, e.g., as a result of file system metadata 166 indicating that the bit was not used. If the block was not backed up, change tracking module 140 sets a bit in non-protected block metadata 164. When performing a backup operation, backup module 130 detects which bits are indicated as changed in changed block metadata 162 and compares with file system metadata 166. Backup module 130 also checks which bits are set in non-protected block metadata 164 and compares those bits with file system metadata 166. If a bit is set in both non-protected block metadata 164 and file system metadata 166, backup module 130 includes the block corresponding to the bits in a backup operation. Backup module 130 detects which blocks to include by performing a logical OR operation on changed block metadata 162 and non-protected block metadata 164 and then performing a logical AND of the result with file system metadata 166. Unlike changed block metadata 162, which is cleared when a backup operation is performed regardless of whether or not a block was actually backed up during the backup operation, non-protected block metadata 164 is persisted until the block is actually backed up. In one embodiment, in response to change tracking module 140 detecting that a backup operation has occurred while there are no open transactions, change tracking module clears non-protected block metadata 164.

Figure 2:
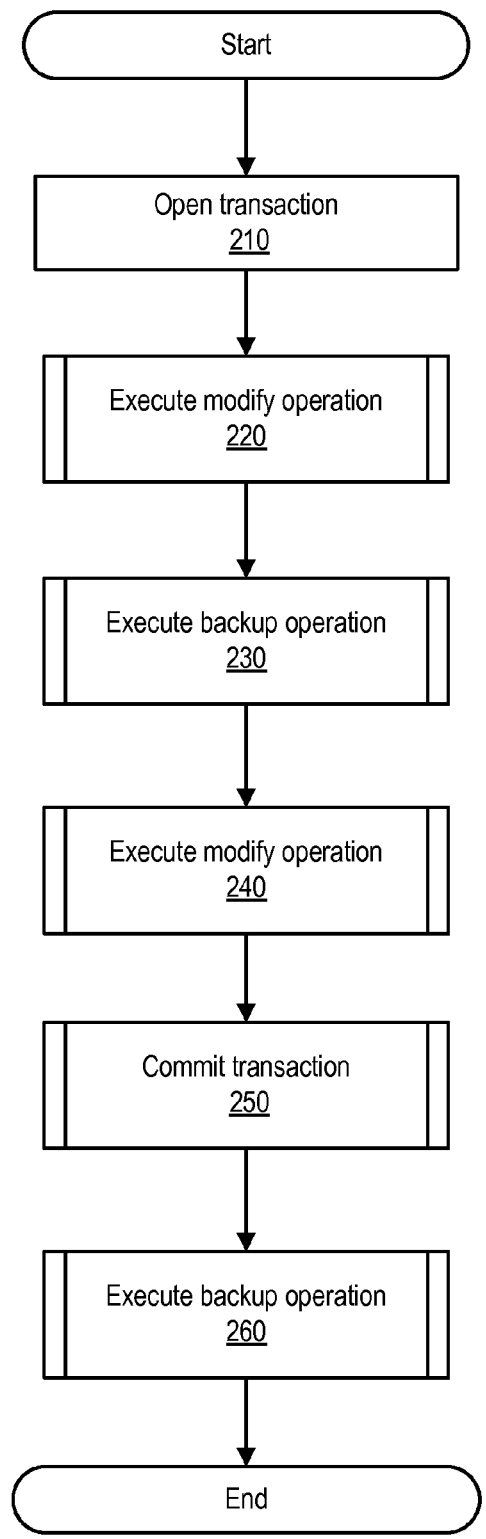
FIG. 2 is a flowchart of a method of backing up data, according to one embodiment of the present invention.

FIG. 2 is a flowchart of a method of backing up data. The method can be performed by a backup module, such as backup module 130 of FIG. 1. In one embodiment, the method involves performing an incremental backup of data, such as data 168 of FIG. 1, managed using a transactional file system, such as file system file system 120 of FIG. 1. The method shown in FIG. 2 is an example sequence that illustrates one example of a method of capturing modified data to be included in an incremental backup operation when a prior backup is performed after a first stage of a multi-stage write operation but before the final stage of the multi-stage write operation, e.g., while a transaction is in an uncommitted state.

At 210, the file system opens a transaction. The file system opens a transaction, for example, in response to receiving an instruction from an application, such as application 115 of FIG. 1. The instruction can include a transaction identifier, such as a transaction number, that the file system should assign to the transaction. Alternatively, the file system can automatically generate a transaction identifier. The instruction can also include information regarding what operations are to be included in the operation. This allows the file system to automatically detect which operations are associated with a transaction and to detect when all operations associated with the transaction have been performed and commit, or close, the transaction in response to detecting that all operations have been performed. Alternatively, the application can include a transaction identifier with operations sent to the file system. By detecting the transaction identifier, the file system knows which transactions are included with a given transaction. The application can provide a separate instruction to close, or commit the transaction. In one embodiment the file system updates file system metadata, such as file system metadata 166 of FIG. 1 to include information indicating the open transaction and generates a bitmap to capture and temporarily store information identifying one or more blocks that are updated by operations associated with the open transaction.

Figure 3:
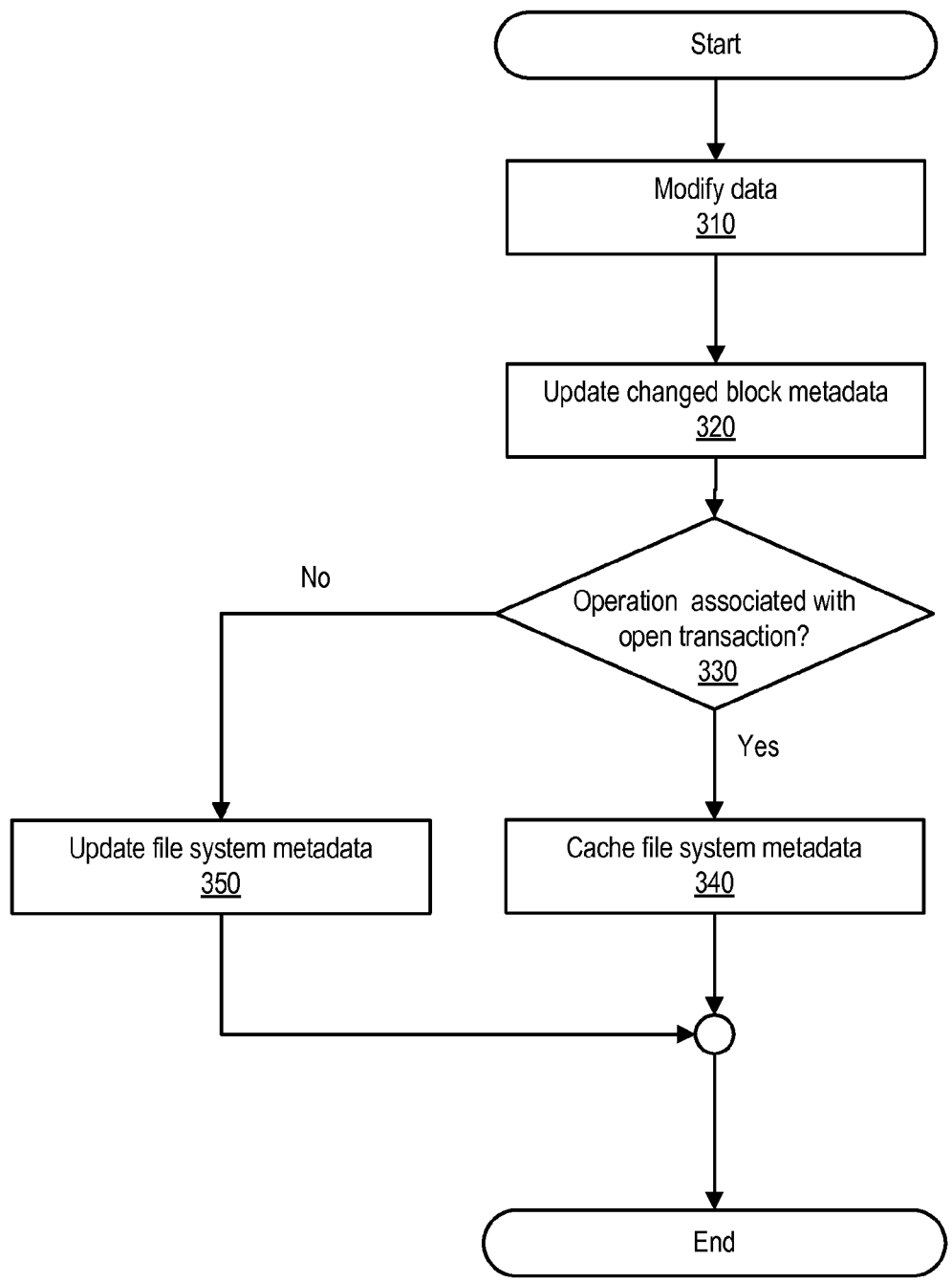
FIG. 3 is a flowchart showing additional details of a modify operation of a method of backing up data, according to one embodiment of the present invention.

As discussed in greater detail with regard to FIG. 3, a modify operation is executed at 220. Modify operation 220 can be executed by an application, such as application 115 of FIG. 1. Alternatively, the operation can be executed by an operating system, not shown, or by the file system itself. A modify operation is any operation that causes a change to data that is managed by the file system. Such operations include creating new files or directories, updating, e.g., adding data to, existing files or directories, updating metadata, and the like.

Figure 4:
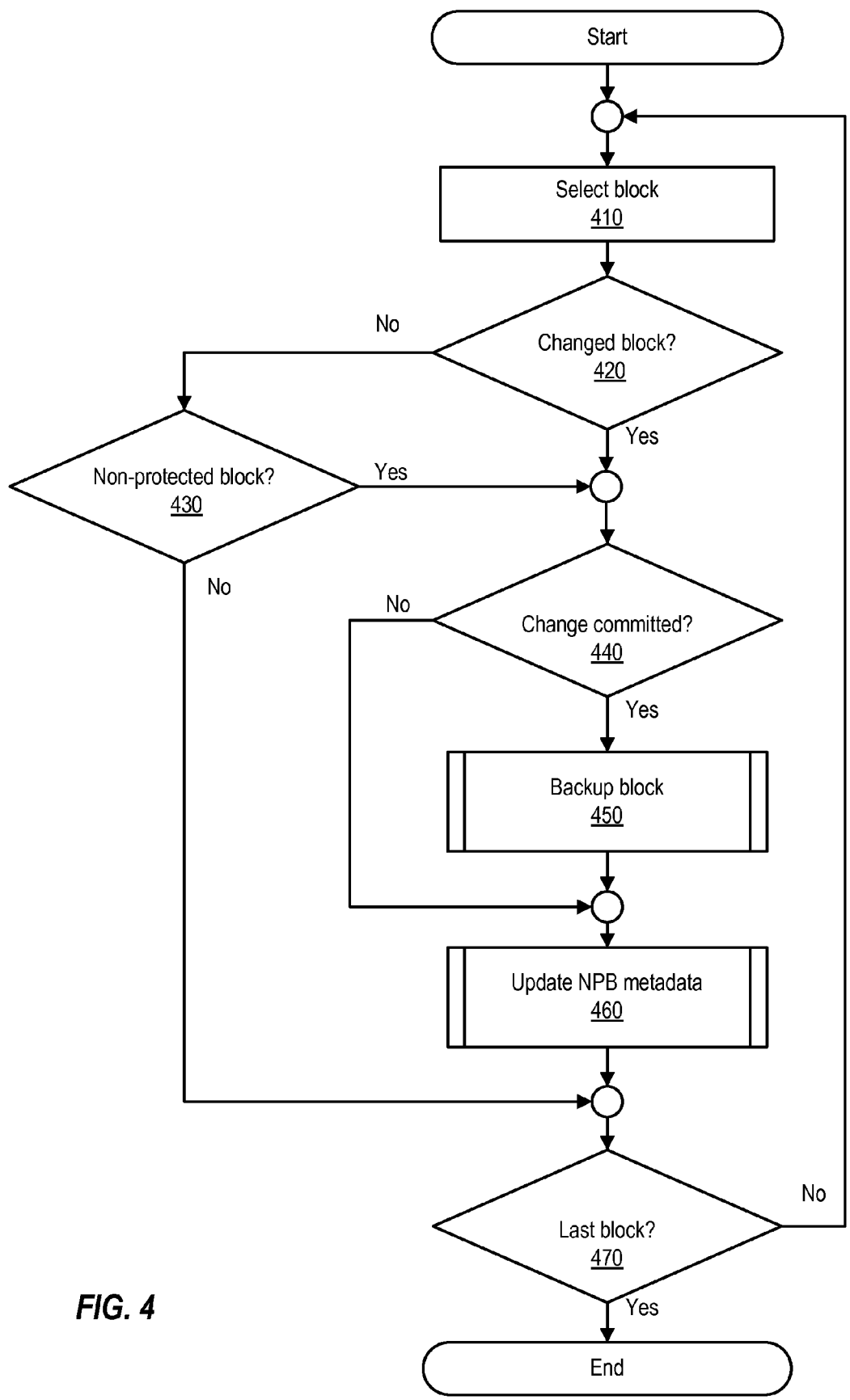
FIG. 4 is a flowchart showing additional details of a backup operation of a method of backing up data, according to one embodiment of the present invention.

As discussed in greater detail with regard to FIG. 4, a backup operation is executed at 230. Backup operation 230 can be performed by a backup module, such as backup module 130 of FIG. 1. In one embodiment, backup operation 230 includes detecting which data is to be included in the backup operation, transferring the data from a source, such as storage device 160 of FIG. 1, to a destination, such as backup storage device 170 of FIG. 1, updating metadata to indicate which data has been backed up, and the like.

At 240, another modify operation is executed. Modify operation 240 is similar to modify operation 220. One significant difference between modify operation 220 and modify operation 240 is that modify operation 220 occurs before backup operation 230 and modify operation 240 occurs after backup operation 230. In an embodiment in which backup operation 230 includes an incremental backup operation, changed block metadata indicating which data has been changed since the previous backup is cleared between modify operation 220 and modify operation 240 such that when modify operation 240 is performed, information identifying the data modified by modify operation 220 is no longer included in the changed block metadata.

Figure 7:
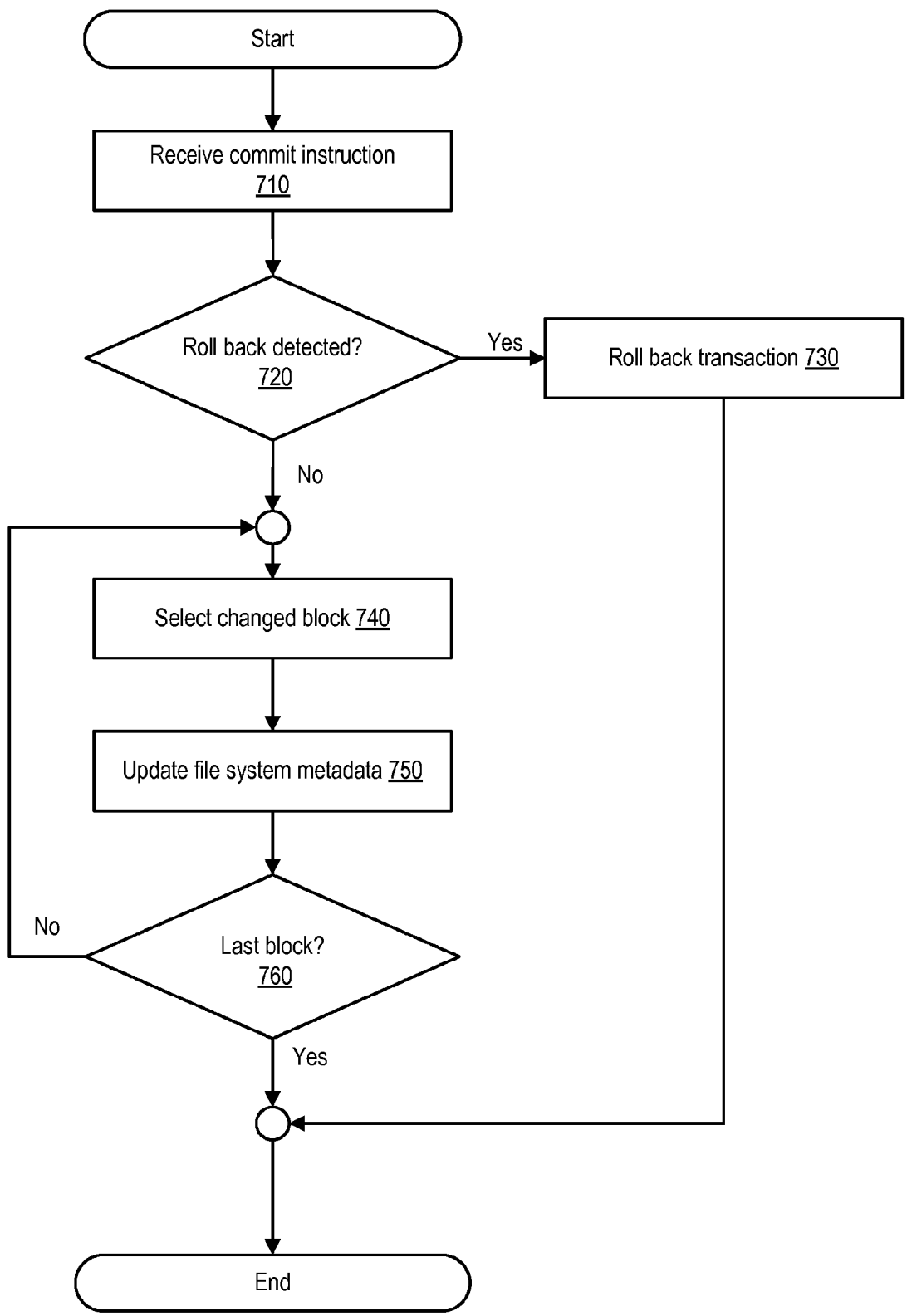
FIG. 7 is a flowchart showing additional details of a commit operation of a method of backing up data, according to one embodiment of the present invention.

As discussed in greater detail with regard to FIG. 7, the transaction opened at 210 is committed at 250. The commit transaction operation 250 is performed by the file system that opened the transaction at 210. Committing the transaction, as at 250, is the final stage of the transaction, during which the operations associated with the transaction are finalized as a single operation.

At 260, another backup operation is executed. Backup operation 260 is similar to backup operation 230. One significant difference is that the backup module performs backup operation 230 while the transaction is still opened, while the backup module performs backup operation 260 after the transaction is committed.

FIG. 3 is a flowchart of a method of modifying data, according to one embodiment of the present invention. In one embodiment, the method is performed by an application, such as application 115 of FIG. 1.

A modify data operation occurs at 310. As a result of modify data operation 310, a change to data, such as data 168 of FIG. 1, is made. For example, modify data operation 310 can be performed in response to the application issuing an instruction to create a new file, or to update an existing file. One or more blocks are changed as a result of modify data operation 310.

At 320, a change tracking module, such as change tracking module 140 of FIG. 1, detects modify data operation 310, identifies which data is changed by modify data operation 310, and updates changed block metadata, such as changed block metadata 162 of FIG. 1. In one embodiment, the change tracking module intercepts the modify data instruction and decodes the instruction to determine a location of the modified data. Alternatively, the change tracking module can query the file system, and/or the storage device in which the data is stored or is to be stored, to determine the location. The location can include a physical address, an extent, e.g., offset and length, a block number, (physical or logical), and the like. After determining the location of the data that is modified, the change tracking module updates the changed block metadata. This can involve, for example, updating one or more bits in bit in a bitmap that corresponds to a block or blocks in which the modified data is stored. Alternatively, the change tracking module can add an address or other information identifying the changed data to a list of information that identifies changed data.

Transactional file systems can process operations from multiple applications, can have multiple open transactions, and can also process modify operations that are not associated with any transactions. At 330, the file system detects whether modify data operation 310 is associated with an open transaction. In an embodiment, modify data operation 310 includes a transaction identifier. The file system detects the transaction identifier and if the transaction identifier belongs to an open transaction, the method proceeds to 340. If modify data operation 310 is not associated with an open transaction, the file system updates file system metadata at 350, indicating that the one or more blocks that are modified as a result of modify data operation 310 are updated.

In response to detecting that modify data operation 310 is associated with an open transaction, the file system caches file system metadata at 340. Typically, a file system identifies blocks that store the data as being in use, and updates various metadata, such as when the block was written, and the like. However, since the modification is part of an open transaction, the file system stores the information indicating that the block is in use until such time as the transaction is closed. The cached information can be stored, for example, in a bitmap of pending modify operations.

FIG. 4 is a flowchart showing additional details of a method of backing up data. In one embodiment, the operations shown in FIG. 4 are performed by a backup module, such as backup module 130 of FIG. 1.

At 410, the backup module selects a block. The backup module will determine whether the block is to be backed up or not. In an embodiment, selecting a block involves accessing a bitmap, such as included in file system metadata 166 of FIG. 1, with entries corresponding to all blocks managed by a given file system. The backup module selects the first entry of the bitmap. Other configurations are possible, such as multiple bitmaps, e.g., a bitmap for each volume. Other types of metadata can be used, such as a list or range of addresses. For the sake of simplicity, the method is described using a bitmap as an example. It is understood that the method is not limited to any particular data structure.

The backup module detects whether the selected entry corresponds to a changed block at 420. The backup module examines a portion of changed block metadata, such as changed block metadata 162 of FIG. 1, that corresponds to the entry of file system metadata. The backup module detects whether the changed block metadata indicates that the block has been changed since a previous backup operation. For example, if the bit in changed block metadata that corresponds to the selected block is set, the backup module determines that the changed block metadata indicates that the block has been changed since a previous backup operation.

If the changed block metadata does not indicate that the block has been changed since a previous backup operation, the backup module checks non-protected block metadata, such as non-protected block metadata 164 of FIG. 1, at 430, to detect whether the block was previously changed, but was not included in a previous backup operation. For example, the backup module can access a corresponding bit in a bitmap included in the non-protected block metadata. If the bit is set, the backup module determines that the non-protected block metadata indicates that the block has been changed since a previous backup operation, but was not included in a backup operation that occurred subsequent to the block being modified. This can occur, for example, if the backup operation was an incremental backup that occurred after the block was modified by a modification operation that was part of a transaction, but before the transaction was committed.

If the block is not indicated as changed and is not included in non-protected block metadata, the backup module excludes the block from the backup operation, and the method proceeds to 470.

If the changed block metadata indicates the block was changed since a previous backup and/or the non-protected block metadata indicates that the block was changed prior to a previous backup but was not backed up in the previous backup, the backup module does not, at this point exclude the block from the backup operation. Instead, the backup module checks the file system metadata, at 440, to detect whether the change has been committed. That is, the backup module checks the corresponding entry in the file system metadata to detect whether the entry indicates that the block is in use. For example, if a bit corresponding to the block in a bitmap included in the file system metadata indicates that the block is in use, the backup module determines that the change has been committed.

Figure 5:
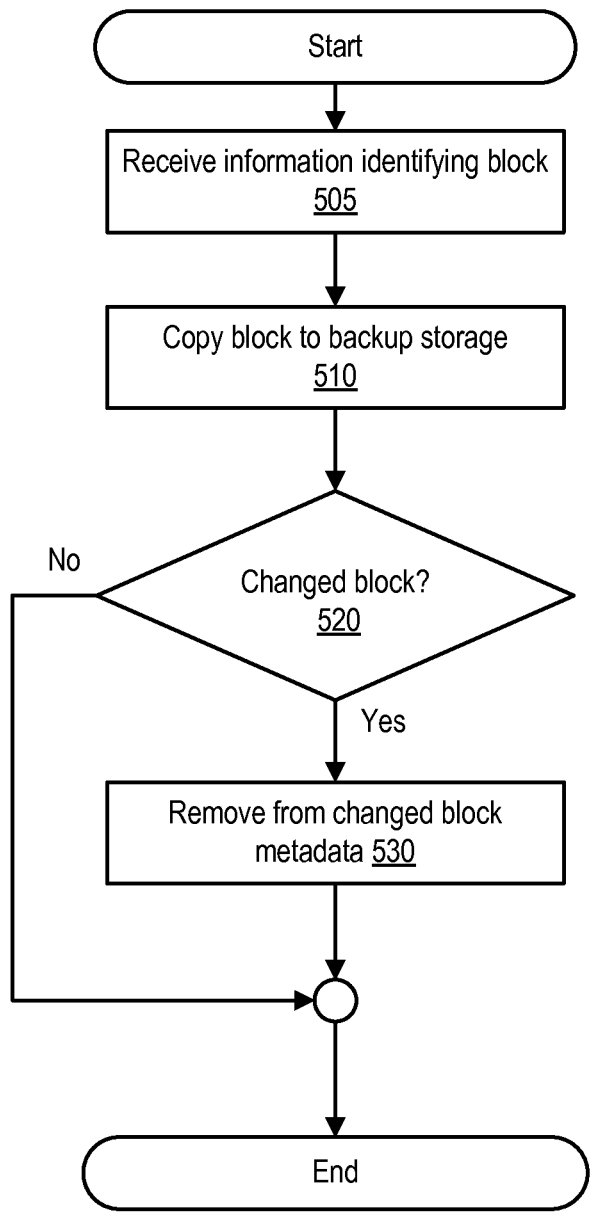
FIG. 5 is a flowchart showing additional details of a copy operation of a method of backing up data, according to one embodiment of the present invention.

If the change has been committed, as indicated by file system metadata, the backup module backs up the block, as discussed in greater detail with regard to FIG. 5. If the file system metadata does not indicate that the block is in use, e.g., the change has not been committed, the backup module excludes the block from the backup operation and the method proceeds to 460. For example, if the block was modified as an operation, e.g., a file creation operation, that is part of a transaction that is still open, the file system metadata does not show the file as having been created yet, so does not show the block as being in use.

Figure 6:
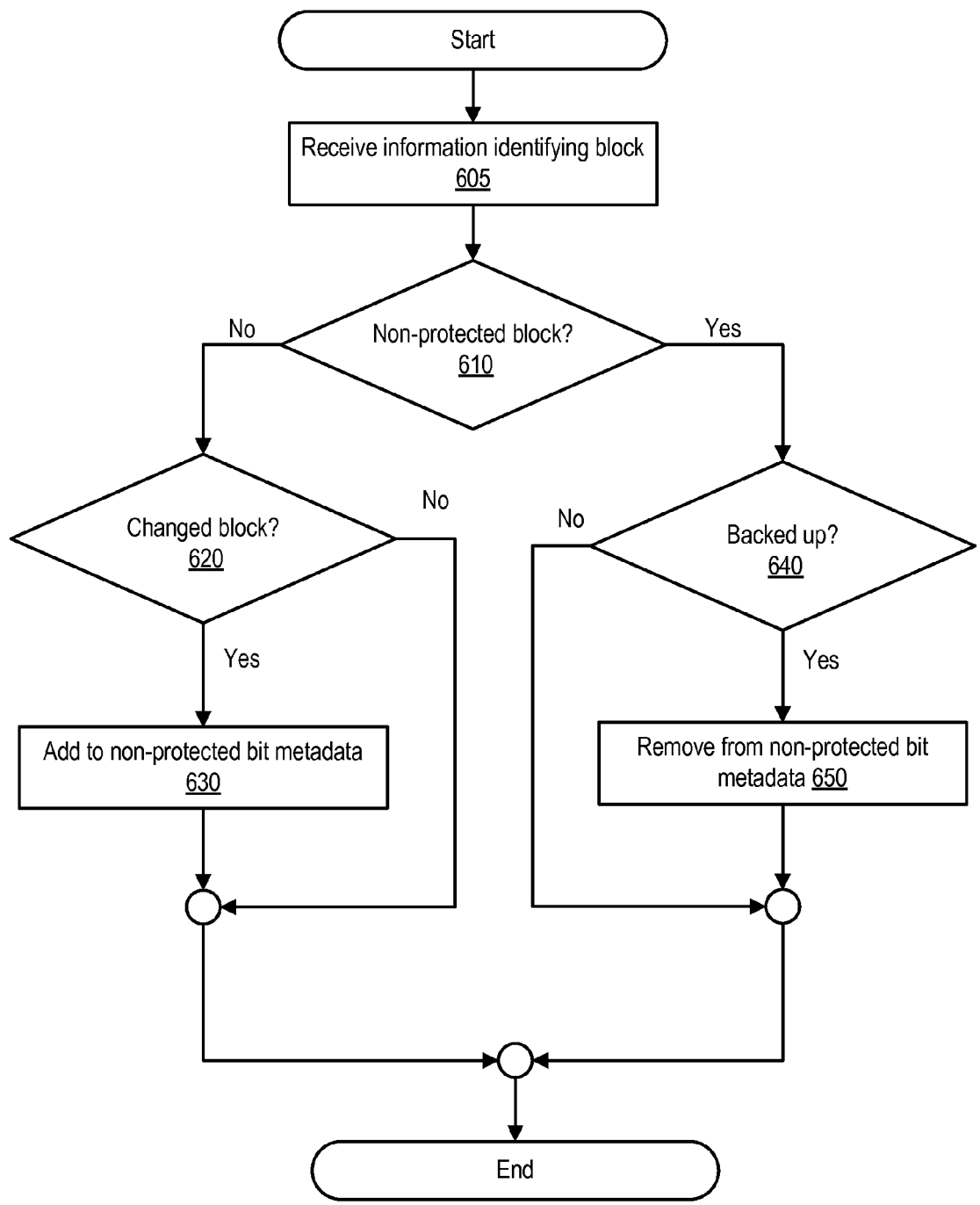
FIG. 6 is a flowchart showing additional details of a metadata update operation of a method of backing up data, according to one embodiment of the present invention.

At 460, as discussed in more detail with regard to FIG. 6, the backup module ensures that the non-protected block metadata is properly updated. This ensures that blocks that have been changed, but are not yet committed at the time of a backup operation are not missed in subsequent backup operations that occur after the change is committed. This also ensures that blocks that are backed up are not included unnecessarily in subsequent backup operations.

At 470, the backup module detects whether the block is the last block. If there are additional blocks, the backup module selects an additional block at 410. If the backup module has traversed all entries in the file system metadata, the method ends.

FIG. 5 is a flowchart of a method of showing additional details of a method of backing up data, according to one embodiment of the present invention. In one embodiment, the method is performed by a backup module, such as backup module 130 of FIG. 1, as part of an incremental backup operation.

The copy module receives, at 505, information identifying a block. Such information can include, for example, a block identifier, a physical address, an extent, or any other information that identifies a portion of data. At 510, the copy module issues an instruction to copy the block from a source, such as storage device 160 of FIG. 1, to a target, such as backup storage device 170 of FIG. 1. In response to the instruction, a copy of the block is created and stored in target.

At 520, the backup module detects if changed block metadata, such as changed block metadata 162 of FIG. 1, indicates that the block was changed since a previous backup operation. If so, the backup module removes the information identifying the block from the changed block metadata at 530.

FIG. 6 is a flowchart of a method of updating non-protected block metadata, such as non-protected block metadata 164 of FIG. 1. The non-protected block metadata indicates whether a block will be included in a backup operation. In one embodiment, the method is performed by a change tracking module, such as change tracking module 140 of FIG. 1.

The change tracking module receives, at 605, information identifying a block. Such information can include, for example, a block identifier, a physical address, an extent, or any other information that identifies a portion of data. At 610, the change tracking module detects whether the non-protected block metadata includes information identifying the block. For example, the change tracking module can detect if a bit corresponding to the block is set in a bitmap included in non-protected block metadata.

If information identifying the block is not included in non-protected block metadata, the change tracking module detects, at 620, whether changed block metadata, such as changed block metadata 162 of FIG. 1, includes information identifying the block as having been changed since a previous backup operation. For example, the change tracking module can detect if a bit corresponding to the block is set in a bitmap included in changed block metadata. If the changed block metadata includes information identifying the block as changed, the change tracking module adds information identifying the block to the non-protected block metadata, at 630. This helps ensure that the block will not be excluded from subsequent backup operations since the non-protected block metadata is not cleared until the block is backed up, unlike the changed block metadata, which is cleared when a backup operation is performed, regardless of whether the block was actually backed up.

If the change tracking module detects at 610 that the non-protected block metadata does include information identifying the block as needing to be backed up, the change tracking module detects, at 640, whether the block was backed up. In one embodiment, the change tracking module accesses a log (not shown) kept by the backup module that includes information identifying which blocks were backed up in a given backup operation. If the change tracking module detects that the block was backed up, the change tracking module removes the information identifying the block from the non-protected block metadata at 650.

FIG. 7 is a flowchart showing additional details of a method of committing a transaction. In one embodiment, the method is performed by a file system, such as file system 120 of FIG. 1.

At 710, the file system receives an instruction to commit an open transaction. The instruction includes information identifying the transaction, such as a transaction number. In one embodiment, the instruction is generated and transmitted by an application, such as application 115 of FIG. 1. Alternatively, the file system can generate the instruction in response to detecting the occurrence of a condition or event, such as detecting that all files of a pre-specified set of files have been created.

At 720, the file system detects whether the transaction should be rolled back. For example, the file system can detect whether all actions that were supposed to be included in the transaction have successfully completed. For example, if a transaction is to include creation of ten files of 1 Gb each, and the file system detects that ten files were created, but one of the files is only 500 Mb, the file system can detect that the file is corrupted and/or incomplete, and that the transaction is therefore not fully complete. In response to such an occurrence, the file system determines that the transaction should be rolled back. The file system can detect that a transaction should be aborted for a number of other reasons, for example in response to receiving an instruction from an application, in response to a timer associated with the transaction expiring, or in response to detecting a failure of an operation associated with the transaction. Such detection can occur before or after receiving a commit instruction.

If the file system detects that the transaction should be rolled back, the file system rolls back the transaction at 730. In one embodiment, this involves updating file system metadata, such as file system metadata 166, to remove all information identifying blocks that were modified as a result of operations associated with the transaction.

If the transaction is not to be rolled back, at 740 the file system selects a block that was changed as a result of an operation included in the transaction. In one embodiment, the file system maintains a separate cache for each open transaction. Each cache includes information identifying blocks changed by operations associated with the transaction. Alternatively, the file system can maintain a log of pending metadata updates and include information identifying which transaction each pending update is associated with and which blocks are affected by each pending update in the log.

The file system updates file system metadata at 750 to include information indicating that the block is in use. In one embodiment, this involves setting a bit that corresponds to the block in a bitmap that includes bits for some or all of the blocks managed by the file system. At 760, the file system detects whether additional blocks were modified by operations associated with the transaction. If so, the file system selects another block, at 740.

Figure 8:
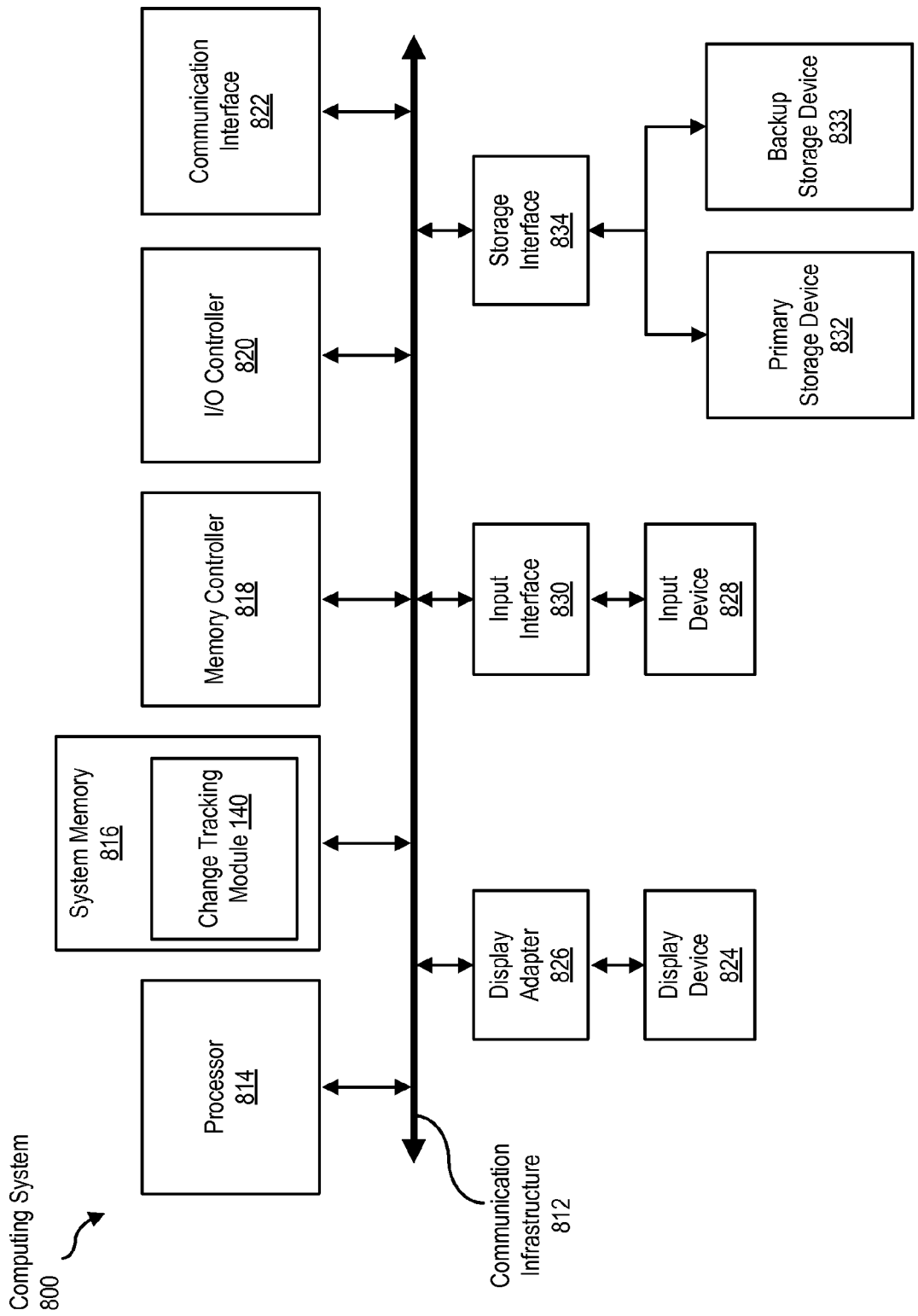
FIG. 8 is a block diagram of a computing device, illustrating how a change tracking module can be implemented in software, according to one embodiment of the present invention.

FIG. 8 is a block diagram of a computing system 800 capable of performing incremental backup operations in a transactional file system as described above. Computing system 800 broadly represents any single or multi-processor computing device or system capable of executing computer-readable instructions. Examples of computing system 800 include, without limitation, any one or more of a variety of devices including workstations, personal computers, laptops, client-side terminals, servers, distributed computing systems, handheld devices (e.g., personal digital assistants and mobile phones), network appliances, storage controllers (e.g., array controllers, tape drive controller, or hard drive controller), and the like. In its most basic configuration, computing system 800 may include at least one processor 814 and a system memory 816. By executing the software that implements a change tracking module 140, computing system 800 becomes a special purpose computing device that is configured to perform backup operations in the manner described above.

Processor 814 generally represents any type or form of processing unit capable of processing data or interpreting and executing instructions. In certain embodiments, processor 814 may receive instructions from a software application or module. These instructions may cause processor 814 to perform the functions of one or more of the embodiments described and/or illustrated herein. For example, processor 814 may perform and/or be a means for performing the operations described herein. Processor 814 may also perform and/or be a means for performing any other operations, methods, or processes described and/or illustrated herein.

System memory 816 generally represents any type or form of volatile or non-volatile storage device or medium capable of storing data and/or other computer-readable instructions. Examples of system memory 816 include, without limitation, random access memory (RAM), read only memory (ROM), flash memory, or any other suitable memory device. Although not required, in certain embodiments computing system 800 may include both a volatile memory unit (such as, for example, system memory 816) and a non-volatile storage device (such as, for example, primary storage device 8002, as described in detail below). In one example, program instructions executable to implement a change tracking module 140 (e.g., as shown in FIG. 1) may be loaded into system memory 816.

In certain embodiments, computing system 800 may also include one or more components or elements in addition to processor 814 and system memory 816. For example, as illustrated in FIG. 8, computing system 800 may include a memory controller 818, an Input/Output (I/O) controller 820, and a communication interface 822, each of which may be interconnected via a communication infrastructure 812. Communication infrastructure 812 generally represents any type or form of infrastructure capable of facilitating communication between one or more components of a computing device. Examples of communication infrastructure 812 include, without limitation, a communication bus (such as an Industry Standard Architecture (ISA), Peripheral Component Interconnect (PCI), PCI express (PCIe), or similar bus) and a network.

Memory controller 818 generally represents any type or form of device capable of handling memory or data or controlling communication between one or more components of computing system 800. For example, in certain embodiments memory controller 818 may control communication between processor 814, system memory 816, and I/O controller 820 via communication infrastructure 812. In certain embodiments, memory controller 818 may perform and/or be a means for performing, either alone or in combination with other elements, one or more of the operations or features described and/or illustrated herein.

I/O controller 820 generally represents any type or form of module capable of coordinating and/or controlling the input and output functions of a computing device. For example, in certain embodiments I/O controller 820 may control or facilitate transfer of data between one or more elements of computing system 800, such as processor 814, system memory 816, communication interface 822, display adapter 826, input interface 8000, and storage interface 8004.

Communication interface 822 broadly represents any type or form of communication device or adapter capable of facilitating communication between computing system 800 and one or more additional devices. For example, in certain embodiments communication interface 822 may facilitate communication between computing system 800 and a private or public network including additional computing systems. Examples of communication interface 822 include, without limitation, a wired network interface (such as a network interface card), a wireless network interface (such as a wireless network interface card), a modem, and any other suitable interface. In at least one embodiment, communication interface 822 may provide a direct connection to a remote server via a direct link to a network, such as the Internet. Communication interface 822 may also indirectly provide such a connection through, for example, a local area network (such as an Ethernet network), a personal area network, a telephone or cable network, a cellular telephone connection, a satellite data connection, or any other suitable connection.

In certain embodiments, communication interface 822 may also represent a host adapter configured to facilitate communication between computing system 800 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1894 host adapters, Serial Advanced Technology Attachment (SATA) and external SATA (eSATA) host adapters, Advanced Technology Attachment (ATA) and Parallel ATA (PATA) host adapters, Fibre Channel interface adapters, Ethernet adapters, or the like.

Communication interface 822 may also allow computing system 800 to engage in distributed or remote computing. For example, communication interface 822 may receive instructions from a remote device or send instructions to a remote device for execution.

As illustrated in FIG. 8, computing system 800 may also include at least one display device 824 coupled to communication infrastructure 812 via a display adapter 826. Display device 824 generally represents any type or form of device capable of visually displaying information forwarded by display adapter 826. Similarly, display adapter 826 generally represents any type or form of device configured to forward graphics, text, and other data from communication infrastructure 812 (or from a frame buffer) for display on display device 824.

As illustrated in FIG. 8, computing system 800 may also include at least one input device 828 coupled to communication infrastructure 812 via an input interface 8000. Input device 828 generally represents any type or form of input device capable of providing input, either computer or human generated, to computing system 800. Examples of input device 828 include, without limitation, a keyboard, a pointing device, a speech recognition device, or any other input device.

As illustrated in FIG. 8, computing system 800 may also include a primary storage device 832 and a backup storage device 833 coupled to communication infrastructure 812 via a storage interface 834. Storage devices 832 and 833 generally represent any type or form of storage device or medium capable of storing data and/or other computer-readable instructions. For example, storage devices 832 and 833 may be a magnetic disk drive (e.g., a so-called hard drive), a floppy disk drive, a magnetic tape drive, an optical disk drive, a flash drive, or the like. Storage interface 834 generally represents any type or form of interface or device for transferring data between storage devices 832 and 833 and other components of computing system 800. A storage device like primary storage device 832 can store information such as deduplication signatures, backup images, and/or a backup catalog.

In certain embodiments, storage devices 832 and 833 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 832 and 833 may also include other similar structures or devices for allowing computer software, data, or other computer-readable instructions to be loaded into computing system 800. For example, storage devices 832 and 833 may be configured to read and write software, data, or other computer-readable information. Storage devices 832 and 833 may also be a part of computing system 800 or may be a separate device accessed through other interface systems.

Many other devices or subsystems may be connected to computing system 800. Conversely, all of the components and devices illustrated in FIG. 8 need not be present to practice the embodiments described and/or illustrated herein. The devices and subsystems referenced above may also be interconnected in different ways from that shown in FIG. 8.

Computing system 800 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to computing system 800 for storage in memory via a network such as the Internet or upon a carrier medium.

The computer-readable medium containing the computer program may be loaded into computing system 800. All or a portion of the computer program stored on the computer-readable medium may then be stored in system memory 816 and/or various portions of storage devices 832 and 833. When executed by processor 814, a computer program loaded into computing system 800 may cause processor 814 to perform and/or be a means for performing the functions of one or more of the embodiments described and/or illustrated herein. Additionally or alternatively, one or more of the embodiments described and/or illustrated herein may be implemented in firmware and/or hardware. For example, computing system 800 may be configured as an application specific integrated circuit (ASIC) adapted to implement one or more of the embodiments disclosed herein.

Figure 9:
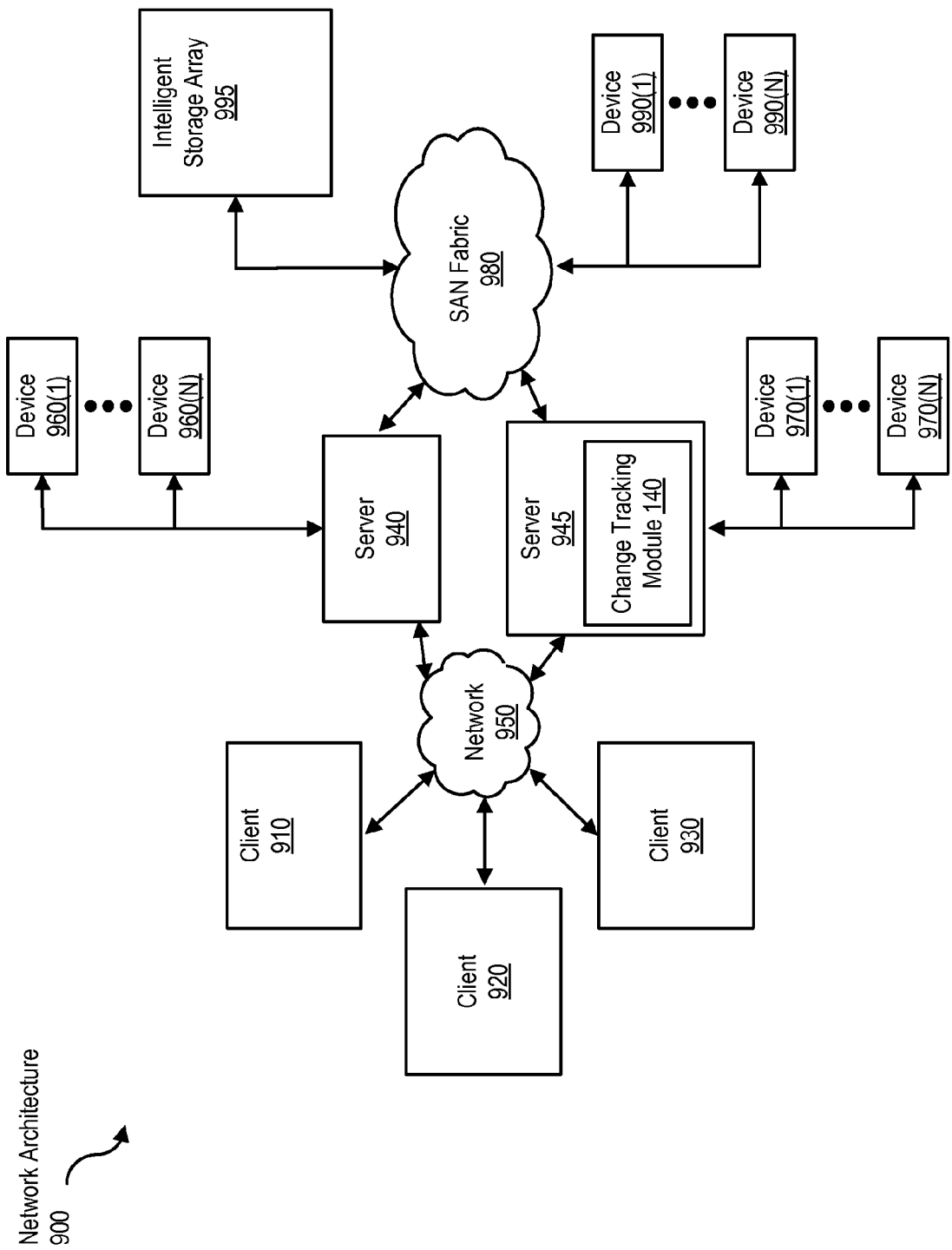
FIG. 9 is a block diagram of a networked system, illustrating how various computing devices can communicate via a network, according to one embodiment of the present invention.

FIG. 9 is a block diagram of a network architecture 900 in which client systems 910, 920, and 930 and servers 940 and 945 may be coupled to a network 950. Client systems 910, 920, and 930 generally represent any type or form of computing device or system, such as computing system 800 in FIG. 8.

Similarly, servers 940 and 945 generally represent computing devices or systems, such as application servers or database servers, configured to provide various database services and/or run certain software applications. Network 950 generally represents any telecommunication or computer network including, for example, an intranet, a wide area network (WAN), a local area network (LAN), a personal area network (PAN), or the Internet. In one example, one or more of client systems 910, 920, and/or 930 may include a change tracking module as shown in FIG. 1.

As illustrated in FIG. 9, one or more storage devices 960(1)-(N) may be directly attached to server 940. Similarly, one or more storage devices 970(1)-(N) may be directly attached to server 945. Storage devices 960(1)-(N) and storage devices 970(1)-(N) generally represent any type or form of storage device or medium capable of storing data and/or other computer-readable instructions. In certain embodiments, storage devices 960(1)-(N) and storage devices 970(1)-(N) may represent network-attached storage (NAS) devices configured to communicate with servers 940 and 945 using various protocols, such as Network File System (NFS), Server Message Block (SMB), or Common Internet File System (CIFS). Such storage devices can store backup information and storage configuration information, as described above.

Servers 940 and 945 may also be connected to a storage area network (SAN) fabric 980. SAN fabric 980 generally represents any type or form of computer network or architecture capable of facilitating communication between multiple storage devices. SAN fabric 980 may facilitate communication between servers 940 and 945 and a plurality of storage devices 990(1)-(N) and/or an intelligent storage array 995. SAN fabric 980 may also facilitate, via network 950 and servers 940 and 945, communication between client systems 910, 920, and 930 and storage devices 990(1)-(N) and/or intelligent storage array 995 in such a manner that devices 990(1)-(N) and array 995 appear as locally attached devices to client systems 910, 920, and 930. As with storage devices 960(1)-(N) and storage devices 970(1)-(N), storage devices 990(1)-(N) and intelligent storage array 995 generally represent any type or form of storage device or medium capable of storing data and/or other computer-readable instructions.

In certain embodiments, and with reference to computing system 800 of FIG. 8, a communication interface, such as communication interface 822 in FIG. 8, may be used to provide connectivity between each client system 910, 920, and 930 and network 950. Client systems 910, 920, and 930 may be able to access information on server 940 or 945 using, for example, a web browser or other client software. Such software may allow client systems 910, 920, and 930 to access data hosted by server 940, server 945, storage devices 960(1)-(N), storage devices 970(1)-(N), storage devices 990(1)-(N), or intelligent storage array 995. Although FIG. 9 depicts the use of a network (such as the Internet) for exchanging data, the embodiments described and/or illustrated herein are not limited to the Internet or any particular network-based environment.

In at least one embodiment, all or a portion of one or more of the embodiments disclosed herein may be encoded as a computer program and loaded onto and executed by server 940, server 945, storage devices 940(1)-(N), storage devices 970(1)-(N), storage devices 990(1)-(N), intelligent storage array 995, or any combination thereof. All or a portion of one or more of the embodiments disclosed herein may also be encoded as a computer program, stored in server 940, run by server 945, and distributed to client systems 910, 920, and 930 over network 950.

In some examples, all or a portion of one of the systems in FIGS. 1, 8, and 9 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In addition, one or more of the components described herein may transform data, physical devices, and/or representations of physical devices from one form to another. For example, a duplication module may transform the behavior of a backup system such that backup image duplication operations can be scheduled to complete in a user-specified window.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
    detecting a first stage of a write operation, wherein
        the first stage of the write operation comprises changing data of a first data block;
    in response to detecting the first stage of the write operation, updating changed blocked metadata to indicate that the first data block has been changed;
    subsequent to the detecting, executing a first backup operation, wherein
        the first backup operation occurs after the first stage of the write operation and before a second stage of the write operation,
        the first data block is not included in the first backup operation,
        non-protected block (NPB) metadata is set to indicate that the first data block has been changed but was not included in the first backup operation, and
        the changed block metadata is cleared;
    subsequent to completing the second stage of the write operation, updating file system metadata to indicate that the first data block has been committed; and
    selecting the first data block to be included in a subsequent backup operation, wherein
        the subsequent backup operation occurs after the second stage of the write operation, and
        the selecting is based on the changed block metadata, the NPB metadata, and the file system metadata.

2. The method of claim 1, further comprising:
    updating the file system metadata in response to detecting the second stage of the write operation, wherein
        the updating the file system metadata comprises including information identifying the first data block in the file system metadata.

3. The method of claim 1, wherein
the selecting is based on detecting that information identifying the first data block is included in the NPB metadata and in the file system metadata.

4. The method of claim 3, further comprising:
adding information identifying the first data block to changed block metadata in response to the detecting the first stage of the write operation.

5. The method of claim 1, further comprising:
removing information identifying the first data block from the changed block metadata in response to the executing the first backup operation.

6. The method of claim 1, wherein
the first backup operation comprises an incremental backup of a transactional file system.

7. The method of claim 1, wherein
the selecting comprises comparing the NPB metadata with the changed block metadata and the file system metadata,
the NPB metadata identifies data blocks to be included in the subsequent backup operation, and
the file system metadata indicates which blocks in a storage device are in use.

8. The method of claim 1, further comprising:
removing information identifying the first data block from the NPB metadata in response to executing the subsequent backup operation.

9. A non-transitory computer readable storage medium storing program instructions executable to:
detect a first stage of a write operation, wherein
the first stage of the write operation comprises changing data of a first data block;
in response to detecting the first stage of the write operation, update changed blocked metadata to indicate that the first data block has been changed;
subsequent to the detecting, execute a first backup operation, wherein
the first backup operation occurs after the first stage of the write operation and before a second stage of the write operation,
the first data block is not included in the first backup operation,
non-protected block (NPB) metadata is set to indicate that the first data block has been changed but was not included in the first backup operation, and
the changed block metadata is cleared;
subsequent to completing the second stage of the write operation, update file system metadata to indicate that the first data block has been committed; and
select the first data block to be included in a subsequent backup operation, wherein
the subsequent backup operation occurs after the second stage of the write operation, and
the selecting is based on the chanced block metadata, the NPB metadata, and the file system metadata.

10. The non-transitory computer readable storage medium of claim 9, wherein the instructions are further executable to:
update the file system metadata in response to detecting the second stage of the write operation, wherein
updating the file system metadata comprises including information identifying the first data block in the file system metadata.

11. The non-transitory computer readable storage medium of claim 9, wherein
selecting the first data block is based on detecting that information identifying the first data block is included in the NPB metadata and in the file system metadata.

12. The non-transitory computer readable storage medium of claim 9, wherein the instructions are further executable to:
add information identifying the first data block to changed block metadata in response to detecting the first stage of the write operation.

13. The non-transitory computer readable storage medium of claim 9, wherein the instructions are further executable to:
remove information identifying the first data block from the changed block metadata in response to executing the first backup operation.

14. The non-transitory computer readable storage medium of claim 9, wherein
selecting the first data block comprises comparing the NPB metadata with the changed block metadata and the file system metadata,
the NPB metadata identifies data blocks to be included in the subsequent backup operation, and
the file system metadata indicates which blocks in a storage device are in use.

15. The non-transitory computer readable storage medium of claim 9, wherein the instructions are further executable to:
remove information identifying the first data block from the NPB metadata in response to executing the subsequent backup operation.

16. A system comprising:
one or more processors; and
a memory coupled to the one or more processors, wherein the memory stores program instructions executable by the one or more processors to:
detect a first stage of a write operation, wherein
the first stage of the write operation comprises changing data of a first data block;
in response to detecting the first stage of the write operation, update changed blocked metadata to indicate that the first data block has been changed;
subsequent to the detecting, execute a first backup operation, wherein
the first backup operation occurs after the first stage of the write operation and before a second stage of the write operation,
the first data block is not included in the first backup operation,
non-protected block (NPB) metadata is set to indicate that the first data block has been changed but was not included in the first backup operation, and
the changed block metadata is cleared;
subsequent to completing the second stage of the write operation, update file system metadata to indicate that the first data block has been committed; and
select the first data block to be included in a subsequent backup operation, wherein
the subsequent backup operation occurs after the second stage of the write operation, and
selecting the first data block is based on the changed block metadata, the NPB metadata, and the file system metadata.

17. The system of claim 16, wherein the instructions are further executable to:
update the file system metadata in response to detecting the second stage of the write operation, wherein
updating the file system metadata comprises including information identifying the first data block in the file system metadata.

18. The system of claim 16, wherein
selecting the first data block is based on detecting that information identifying the first data block is included in the NPB metadata and in the file system metadata.

19. The system of claim 16, wherein
selecting the first data block comprises comparing the NPB metadata with the changed block metadata and the file system metadata,
the NPB metadata identifies data blocks to be included in the subsequent backup operation, and
the file system metadata indicates which blocks in a storage device are in use.

20. The system of claim 16, wherein the instructions are further executable to:
remove information identifying the first data block from changed block metadata in response to executing the first backup operation, and
remove information identifying the first data block from the NPB metadata in response to executing the subsequent backup operation.

* * * * *